(12) United States Patent
Sewell

(10) Patent No.: US 10,221,602 B2
(45) Date of Patent: Mar. 5, 2019

(54) VACUUM SYSTEM

(71) Applicant: The Charles Machine Works, Inc., Perry, OK (US)

(72) Inventor: Cody L. Sewell, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 135 days.

(21) Appl. No.: 15/481,139

(22) Filed: Apr. 6, 2017

(65) Prior Publication Data

US 2017/0292306 A1 Oct. 12, 2017

Related U.S. Application Data

(60) Provisional application No. 62/318,870, filed on Apr. 6, 2016.

(51) Int. Cl.
*E02F 3/88* (2006.01)
*A47L 5/00* (2006.01)
(Continued)

(52) U.S. Cl.
CPC .......... *E05F 1/1091* (2013.01); *B60P 3/2245* (2013.01); *B65D 90/008* (2013.01);
(Continued)

(58) Field of Classification Search
CPC ...... B09B 1/00; B60P 1/16; B60P 1/30; B60P 1/32; B60P 1/34; B60P 1/60; B60P 1/2245; B60P 1/28; B60P 1/1283; B60P 3/22; B60P 3/2255; B60P 3/2245; B62D 33/08; B62D 33/10; B65D 90/623; B65D 90/626; B65D 90/54; B65D 90/008; B65D 2590/664;
(Continued)

(56) References Cited

U.S. PATENT DOCUMENTS 124,768 A * 3/1872 Snyder ................. B65D 50/068
220/210
187,768 A 2/1877 Munzinger
(Continued)

OTHER PUBLICATIONS

United States Patent and Trademark Office, "Office Action Summary", dated Nov. 1, 2016, U.S. Appl. No. 14/737,240, 20 pages, Alexandria, VA.
(Continued)

*Primary Examiner* — J. Gregory Pickett
*Assistant Examiner* — Gideon Weinerth
(74) *Attorney, Agent, or Firm* — Tomlinson McKinstry, P.C.

(57) ABSTRACT

A vacuum system for use in excavation operations. The system uses a tank having an open end that is closed by a door. The door is opened and closed by a door lifting assembly made up of an upper linkage arm, a lower linkage arm and a hydraulic cylinder. A socket is formed in the upper linkage arm, and a shaft housing is formed in the lower linkage arm. The shaft housing engages with the socket to latch the door closed. The upper linkage arm is attached to the door at a first pivot axis and is attached to the lower linkage arm at a second pivot axis. The lower linkage arm is attached to a side of the tank at a third pivot axis. When the door is open, the second pivot axis extends below a reference plane that contains the first and third pivot axis.

20 Claims, 13 Drawing Sheets

(51) Int. Cl.
    *B65D 90/62*       (2006.01)
    *B65D 90/00*       (2006.01)
    *F16J 13/18*        (2006.01)
    *E05F 1/10*         (2006.01)
    *B60P 3/22*         (2006.01)

(52) U.S. Cl.
    CPC ...... *B65D 90/623* (2013.01); *B65D 2590/664* (2013.01); *E05Y 2900/516* (2013.01); *E05Y 2900/531* (2013.01); *F16J 13/18* (2013.01); *Y10T 292/216* (2015.04)

(58) Field of Classification Search
    CPC ..... B65D 2590/662; B60J 5/042; B60J 5/125; E01H 1/0836; E05F 1/1091; E02F 3/00; E02F 3/88; E02F 3/8816; E02F 3/925; E02F 5/108; E02F 5/003; E05Y 2900/516; E05Y 2900/531; E05Y 2900/60; E05Y 2900/602; E05Y 2900/604; F15B 15/02; F15B 2211/7057; F16J 13/16; F16J 13/18; F16J 13/20; F16J 13/22; Y10S 277/921; Y10S 37/905; Y10T 16/547; Y10T 292/216
    USPC ...... 7/347, 905, 317; 49/386, 255, 205, 248, 49/229, 199, 240, 208, 253; 105/377.07, 105/377.08; 220/260, 211, 315, 319, 331, 220/582, 344, 244, 333; 222/164; 296/183.1, 183.2, 186.4; 298/11, 17 R, 298/17.5, 19 R, 19 B, 22 R, 22 J; 406/39; 414/425, 469, 471; 15/340.1
    See application file for complete search history.

(56) References Cited

U.S. PATENT DOCUMENTS

| | | | |
|---|---|---|---|
| 522,137 A | 6/1894 | Walker | |
| 1,287,290 A | 12/1918 | Golden | |
| 1,311,009 A | 7/1919 | Rinehimer | |
| 1,944,976 A | 1/1934 | Hamilton | |
| 2,264,216 A | 11/1941 | Milligan | |
| 2,352,192 A | 6/1944 | Gasche | |
| 2,556,354 A | 6/1951 | Williamson et al. | |
| 2,556,578 A * | 6/1951 | Dohm, Jr. | A22C 11/02 220/262 |
| 2,584,500 A * | 2/1952 | Riordan | F16J 13/20 220/324 |
| 2,639,144 A | 5/1953 | Long | |
| 2,639,601 A | 5/1953 | Miller | |
| 2,734,656 A | 2/1956 | Schonfeld | |
| 2,816,683 A | 12/1957 | Miers et al. | |
| 2,823,825 A | 2/1958 | Coffman | |
| 2,867,329 A | 1/1959 | Miller | |
| 2,927,787 A | 3/1960 | Maher | |
| 3,195,761 A | 7/1965 | Coates | |
| 3,310,329 A * | 3/1967 | Luker | F16J 13/20 220/319 |
| 3,311,255 A | 3/1967 | Loveless | |
| 3,363,944 A * | 1/1968 | Lablanche | B60P 1/20 298/22 J |
| 3,540,618 A | 11/1970 | Jakobsen | |
| 3,628,687 A | 12/1971 | Townsend | |
| 3,713,472 A | 1/1973 | Dozois | |
| 3,768,203 A | 10/1973 | Bellucci | |
| 3,841,676 A | 10/1974 | Hover | |
| 3,860,142 A | 1/1975 | Jurges | |
| 3,888,045 A | 6/1975 | Piegza | |
| 3,924,778 A | 12/1975 | Sorensen | |
| 3,930,324 A * | 1/1976 | Wightman | E02F 3/8825 37/189 |
| 4,017,281 A | 4/1977 | Johnstone | |
| 4,119,238 A | 10/1978 | Ja'afar et al. | |
| 4,135,640 A | 1/1979 | MacQuilkin et al. | |
| 4,155,586 A | 5/1979 | Flynn | |
| 4,199,837 A | 4/1980 | Fisco, Jr. | |
| 4,222,404 A | 9/1980 | Flynn | |
| 4,307,541 A | 12/1981 | Farmer et al. | |
| 4,334,633 A | 6/1982 | Piegza | |
| 4,518,095 A | 5/1985 | Engwert | |
| 4,566,375 A | 1/1986 | van der Schoot | |
| 4,644,874 A | 2/1987 | Kleykamp | |
| 4,669,628 A | 6/1987 | Hatta | |
| 4,690,070 A | 9/1987 | Miller | |
| 4,922,571 A | 5/1990 | Driear | |
| 4,935,984 A * | 6/1990 | Bryant | E03F 7/10 134/167 C |
| 5,016,717 A | 5/1991 | Simons et al. | |
| 5,021,156 A | 6/1991 | Sloan | |
| 5,092,963 A | 3/1992 | Barker et al. | |
| 5,103,592 A | 4/1992 | Janitzky | |
| 5,141,528 A | 8/1992 | Boczkiewicz et al. | |
| 5,191,993 A | 3/1993 | Wanger et al. | |
| 5,299,370 A | 4/1994 | Gyori et al. | |
| 5,366,317 A | 11/1994 | Solimar | |
| 5,394,650 A | 3/1995 | Dean | |
| 5,596,788 A | 1/1997 | Linville et al. | |
| 5,700,043 A | 12/1997 | Rohard et al. | |
| 5,718,017 A * | 2/1998 | Pavlick | B65F 3/0209 15/340.1 |
| 5,791,073 A | 8/1998 | Palmer et al. | |
| 5,840,102 A * | 11/1998 | McCracken | B01D 46/002 95/268 |
| 5,919,421 A | 7/1999 | Monz et al. | |
| 5,937,581 A | 8/1999 | Matye et al. | |
| 5,960,980 A | 10/1999 | Burke et al. | |
| 5,996,171 A * | 12/1999 | Bowers | B01D 46/002 15/340.1 |
| 6,007,270 A | 12/1999 | Bowman | |
| 6,050,199 A | 4/2000 | Anderson et al. | |
| 6,055,775 A | 5/2000 | Dering et al. | |
| 6,109,823 A | 8/2000 | Halferty et al. | |
| 6,182,952 B1 | 2/2001 | Guiterrez | |
| 6,293,051 B1 | 9/2001 | Matye | |
| 6,385,867 B1 | 5/2002 | Slabach et al. | |
| 6,386,598 B1 | 5/2002 | Dykstra et al. | |
| 6,391,258 B1 | 5/2002 | Peake et al. | |
| 6,438,792 B1 | 8/2002 | Cappellotto | |
| 6,407,605 B1 | 10/2002 | Gilman et al. | |
| 6,615,849 B1 | 9/2003 | Gilman et al. | |
| 6,966,724 B2 | 11/2005 | Robinson | |
| 7,255,039 B2 | 8/2007 | Halliday et al. | |
| 7,451,521 B2 | 11/2008 | Cappellotto | |
| 7,712,181 B2 | 5/2010 | Riach | |
| 7,802,694 B2 | 9/2010 | Lee | |
| 7,837,050 B2 | 11/2010 | Maybury, Jr. | |
| 8,066,140 B1 | 11/2011 | Young et al. | |
| 8,297,463 B2 | 10/2012 | McQuaid et al. | |
| 8,360,260 B2 | 1/2013 | Maybury, Jr. | |
| 8,540,103 B2 | 9/2013 | Lollis et al. | |
| 8,596,697 B1 | 12/2013 | Haibel | |
| 8,667,717 B2 | 3/2014 | Maybury et al. | |
| 8,802,023 B1 | 8/2014 | Lewis et al. | |
| 8,925,753 B2 | 1/2015 | Maybury | |
| 8,997,307 B2 * | 4/2015 | Raiche | A01D 51/007 15/320 |
| 9,057,180 B1 | 6/2015 | Sewell | |
| 9,394,731 B2 * | 7/2016 | Buckner | E05B 65/001 |
| 2002/0000748 A1 | 1/2002 | Fuller et al. | |
| 2002/0088086 A1 * | 7/2002 | Ray | E05D 3/022 16/280 |
| 2003/0172687 A1 * | 9/2003 | Bartalucci | D06B 23/10 68/4 |
| 2004/0108317 A1 | 6/2004 | Buckner | |
| 2005/0264144 A1 * | 12/2005 | Verbeek | E05D 15/46 312/323 |
| 2006/0236499 A1 * | 10/2006 | Cappellotto | B60P 1/34 15/340.1 |
| 2008/0028688 A1 | 2/2008 | Neuber | |
| 2008/0083143 A1 * | 4/2008 | Maybury | E02F 3/8816 37/317 |

(56) References Cited

U.S. PATENT DOCUMENTS

| | | | |
|---|---|---|---|
| 2008/0244859 A1* | 10/2008 | Maybury | E02F 3/8816 15/340.2 |
| 2008/0257888 A1* | 10/2008 | Lee | B01J 3/03 220/324 |
| 2009/0081091 A1* | 3/2009 | Lee | B01J 3/03 422/307 |
| 2010/0064649 A1 | 3/2010 | Harada et al. | |
| 2010/0320204 A1 | 12/2010 | Maybury, Jr. | |
| 2010/0325481 A1 | 12/2010 | Dahan et al. | |
| 2010/0326481 A1* | 12/2010 | Buckner | E02F 3/384 134/166 C |
| 2011/0031801 A1* | 2/2011 | Malatesta | B60P 3/2205 298/17 B |
| 2011/0107548 A1 | 5/2011 | Maybury, Jr. | |
| 2011/0192848 A1* | 8/2011 | Lollis | F16J 13/08 220/327 |
| 2011/0233986 A1* | 9/2011 | Obermeyer | B60P 1/28 298/22 R |
| 2011/0296646 A1 | 12/2011 | Showley | |
| 2013/0097933 A1 | 4/2013 | Royer et al. | |
| 2013/0134163 A1 | 5/2013 | Maybury, Jr. | |
| 2013/0189060 A1* | 7/2013 | Lamonte | E02F 3/8825 414/507 |
| 2014/0010603 A1* | 1/2014 | Blais | B60P 1/60 406/39 |
| 2014/0017018 A1* | 1/2014 | Blais | E01H 1/0836 406/39 |
| 2014/0165326 A1* | 6/2014 | Tacke | E01H 1/0836 15/340.1 |
| 2014/0353999 A1* | 12/2014 | Yielding | B60P 1/56 296/24.3 |
| 2015/0037124 A1* | 2/2015 | Longagna | B66C 1/101 414/425 |
| 2015/0274057 A1* | 10/2015 | Hinde | B60P 1/162 298/22 R |
| 2015/0291350 A1 | 10/2015 | Sewell et al. | |
| 2015/0308574 A1 | 10/2015 | Kegler | |
| 2016/0362232 A1* | 12/2016 | Sewell | B01J 3/03 |
| 2017/0292306 A1* | 10/2017 | Sewell | E05F 1/1091 |
| 2018/0104622 A1* | 4/2018 | Dawson | B01D 21/10 |

OTHER PUBLICATIONS

United States Patent and Trademark Office, "Office Action Summary", dated May 2, 2017, U.S. Appl. No. 14/737,240, 12 pages, Alexandria, VA.

* cited by examiner

VACUUM SYSTEM

CROSS REFERENCE TO RELATED APPLICATION

This application claims the benefit of U.S. Provisional Patent Application Ser. No. 62/318,870 filed on Apr. 6, 2016, the entire contents of which are incorporated herein by reference.

SUMMARY OF THE INVENTION

The present invention is directed to a vacuum system. The vacuum system comprises a tank having an open end, a closed end, and a first side having a stub attached to and projecting out therefrom, a door used to close the open end of the tank, and a door lifting assembly. The door lifting assembly comprises an upper linkage arm, a lower linkage arm, and a hydraulic cylinder. The upper linkage arm has a first end connected to an outer surface of the door and a second end. The upper linkage arm further comprises a socket disposed between the first end and the second end. The lower linkage arm has a first end and a second end. The lower linkage arm further comprises a stub housing disposed between the first end and the second end through which the stub is received. The hydraulic cylinder is connected to the second end of the lower linkage arm. Activation of the hydraulic cylinder causes the socket on the upper linkage arm to engage with the stub housing disposed in the lower linkage arm.

The present invention is also directed to a lifting mechanism for opening a vacuum tank. The vacuum tank comprises a door and a tank. The lifting mechanism comprises an upper linkage arm, a lower linkage arm and a hydraulic cylinder. The upper linkage arm has a first end pivotally secured to the door at first pivot axis and a second end. The lower linkage arm has a first end and a second end and comprises a second pivot axis disposed between the first end and the second end. The lower linkage arm is pivotally secured to a first side of the tank at the second pivot axis, and the first end of the lower linkage arm is pivotally secured to the second end of the upper linkage arm at a third pivot axis. The hydraulic cylinder is connected to the second end of the lower linkage arm. The first pivot axis and the second pivot axis are on a first plane when the linkage arm are fully extended and the door is in an open position, and the third pivot axis is beneath the first plane when the linkage arms are fully extended and the door is in an open position.

The present invention is further directed to an apparatus comprising a tank having an open end and carrying an externally projecting shaft having a shaft axis, a door hingedly mounted at the tank's open end and movable between open and closed positions, and an elongate lower arm supported by the tank and rotatable about the shaft axis. The apparatus further comprises an elongate upper arm pivotally secured to the door at a first pivot axis and pivotally secured to the lower arm at a second pivot axis spaced from the first pivot axis. The second pivot axis of the lower arm crosses a reference plane as the door approaches its open position. The reference plane contains both the shaft axis and the first pivot axis.

The present invention is even further directed to an apparatus comprising a tank having an open end and carrying an externally projecting shaft, a door hingedly mounted at the tank's open end and movable between open and closed positions, and an elongate lower arm having a shaft housing through which the shaft extends. The apparatus further comprises an elongate upper arm pivotally secured to the door at a first pivot axis and pivotally secured to the lower arm at a second pivot axis spaced from the first pivot axis. The second arm has a socket that opens toward the first pivot axis and within which the shaft housing of the lower arm is at least partially positionable.

DESCRIPTION OF THE PREFERRED EMBODIMENTS

Figure 1:
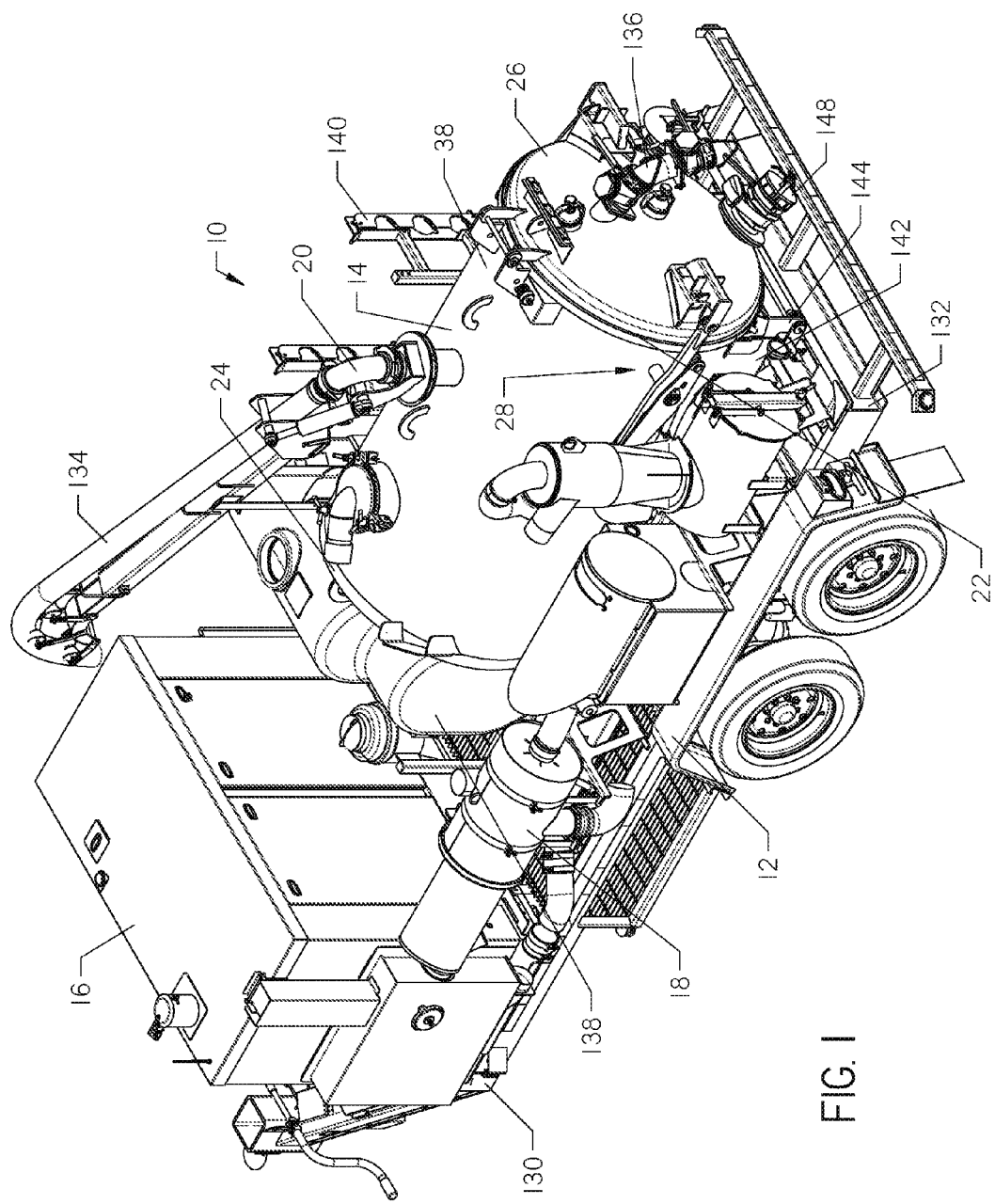
FIG. 1 is a perspective view of a first side of a vacuum system. The vacuum system comprises a tank having a door closing its open end. The door is shown in a closed position.
Figure 2:
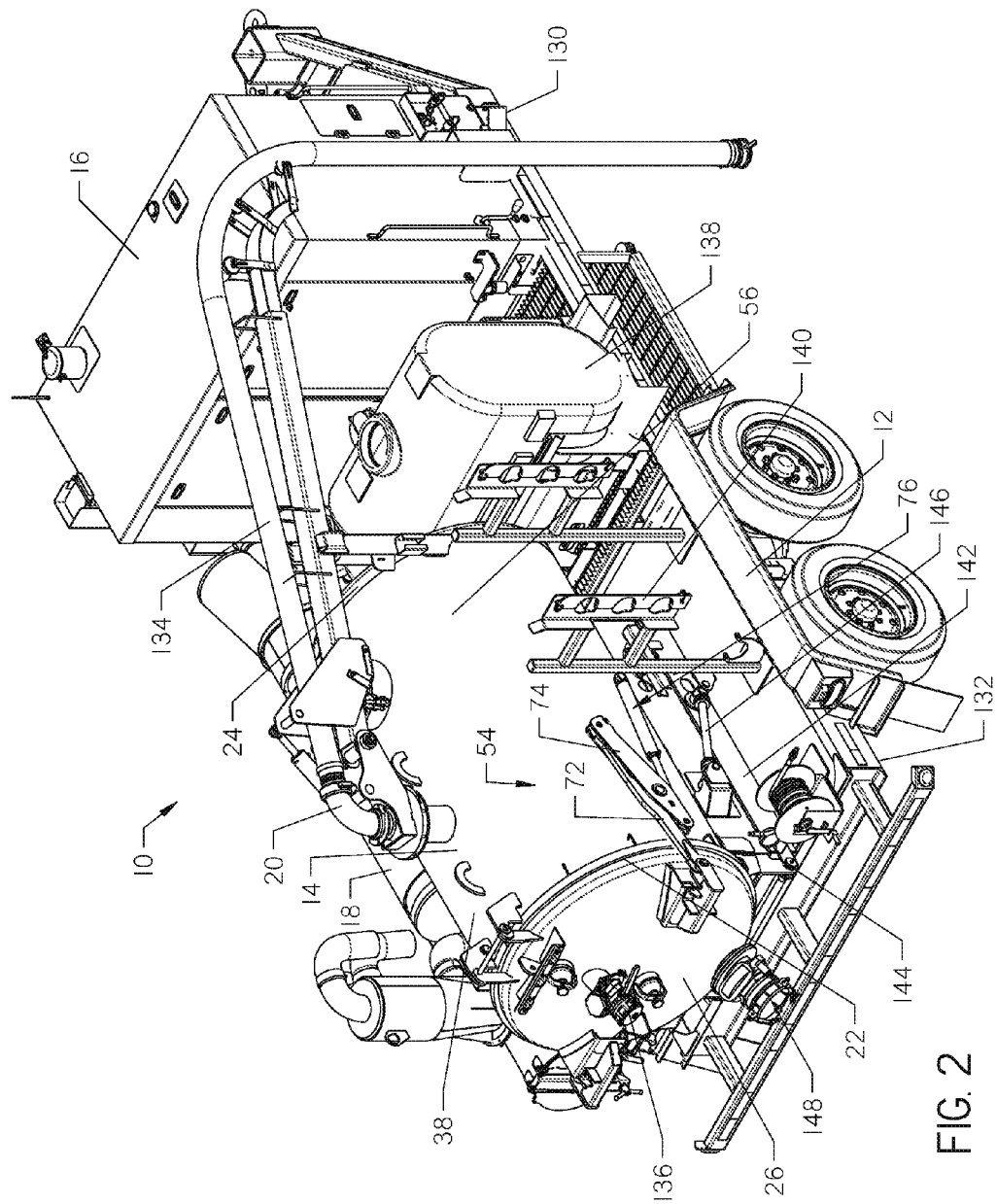
FIG. 2 is a perspective view of the vacuum system of FIG. 1 showing the opposite second side of the system with the door in the closed position.
Figure 3:
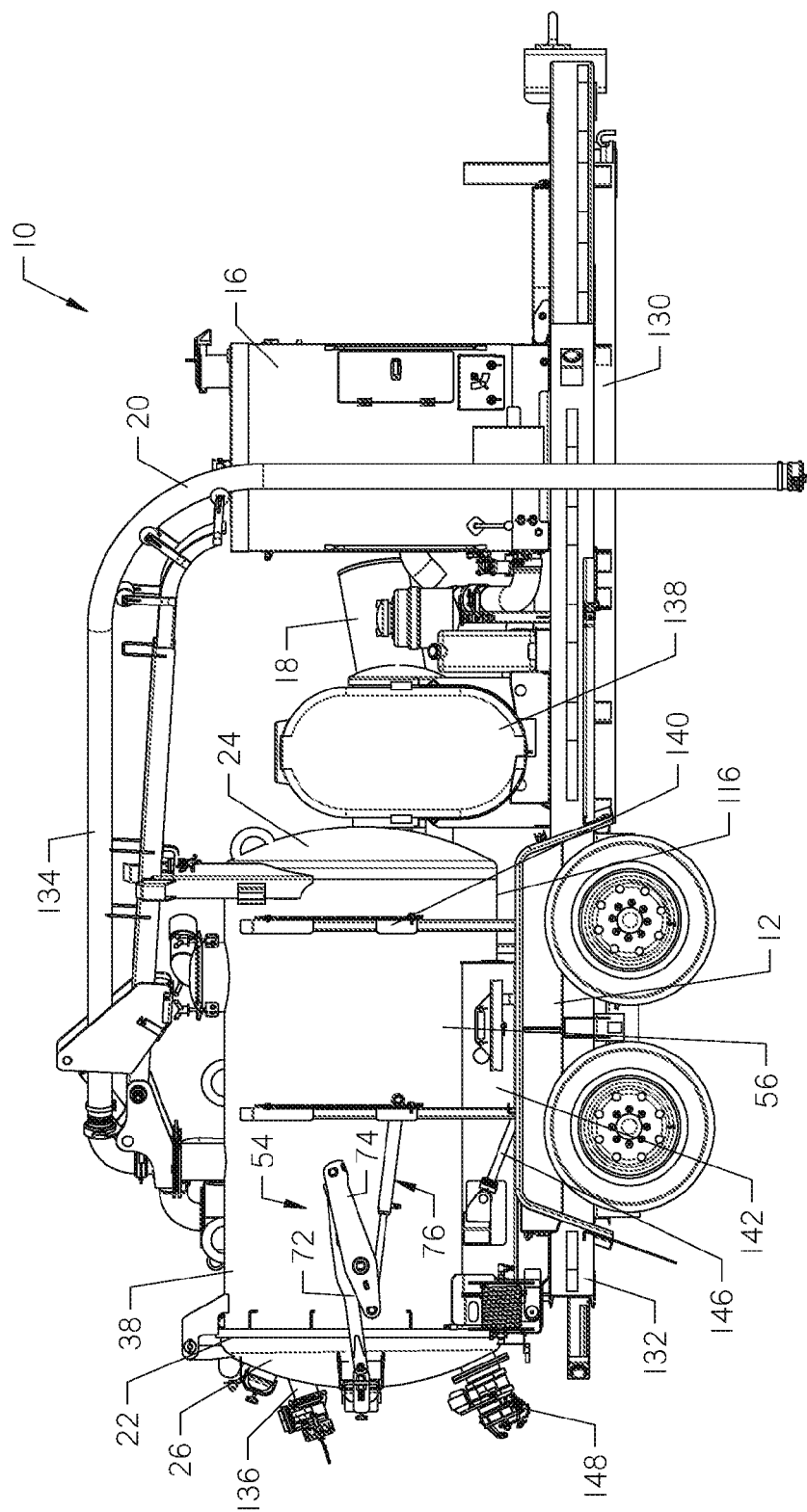
FIG. 3 is a side view of the vacuum system of FIG. 2.

With reference to FIGS. 1-3, a vacuum system 10 is shown supported on a trailer 12. The vacuum system 10 may also be supported on a truck. The vacuum system 10 may be used to assist in excavation or clean-up operations. The vacuum system 10 comprises a tank 14, a power source 16, a vacuum pressure system 18, and a vacuum hose 20. The tank 14 will be discussed first herein and the remaining components of the system 10 will be described later on in this application.

As shown in FIGS. 1-3, the tank 14 is generally cylindrical and has an open end 22 and a closed end 24. The open end 22 of the tank 14 is closed by a door 26. The door 26 is shown in a closed position in FIGS. 1-3. A first door lifting assembly or lifting mechanism 28 is used to open and close the door 26.

Figure 4:
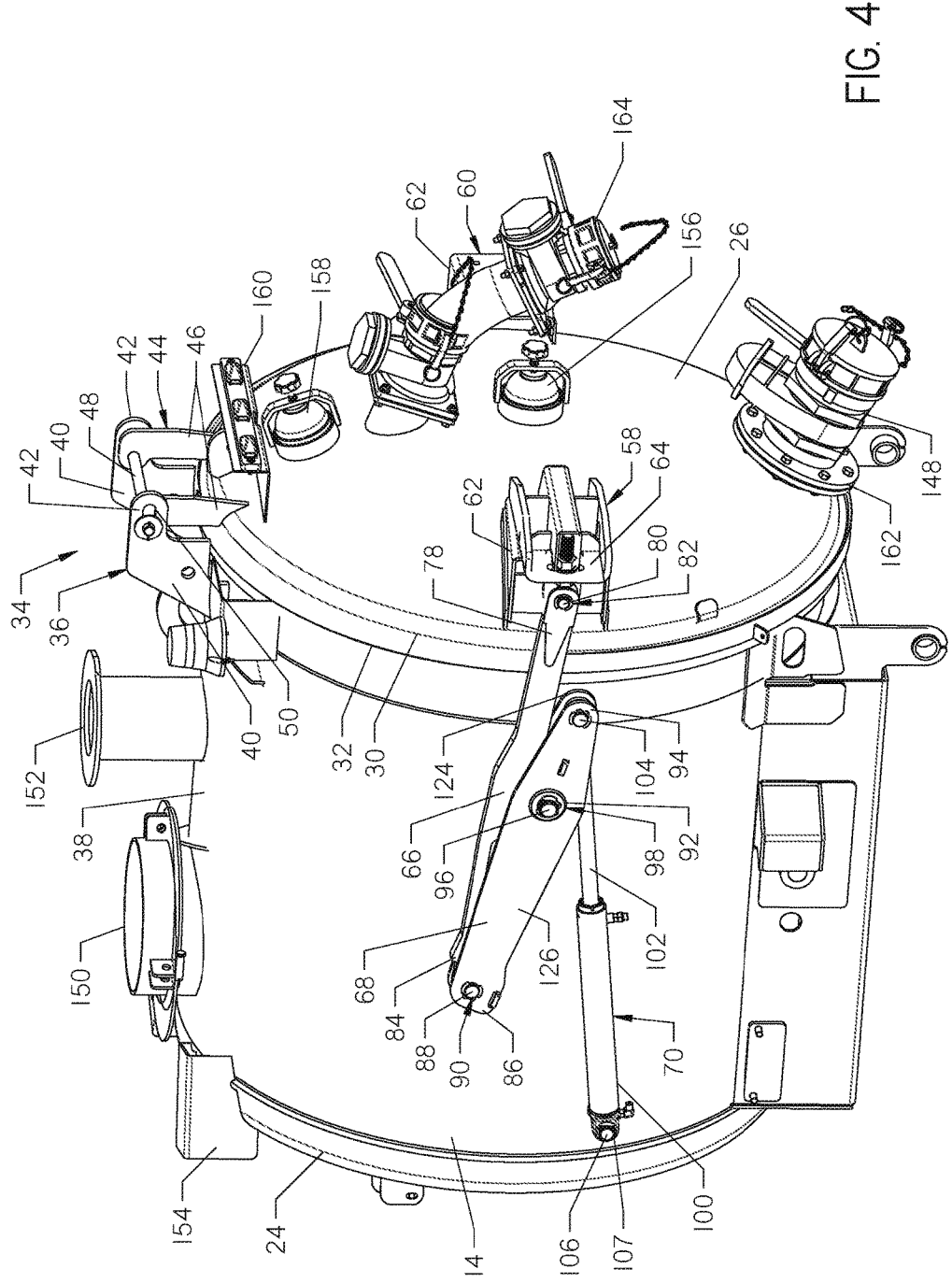
FIG. 4 is a perspective view of a first side of the tank. The tank is removed from vacuum system and the door is in the closed position.
Figure 5:
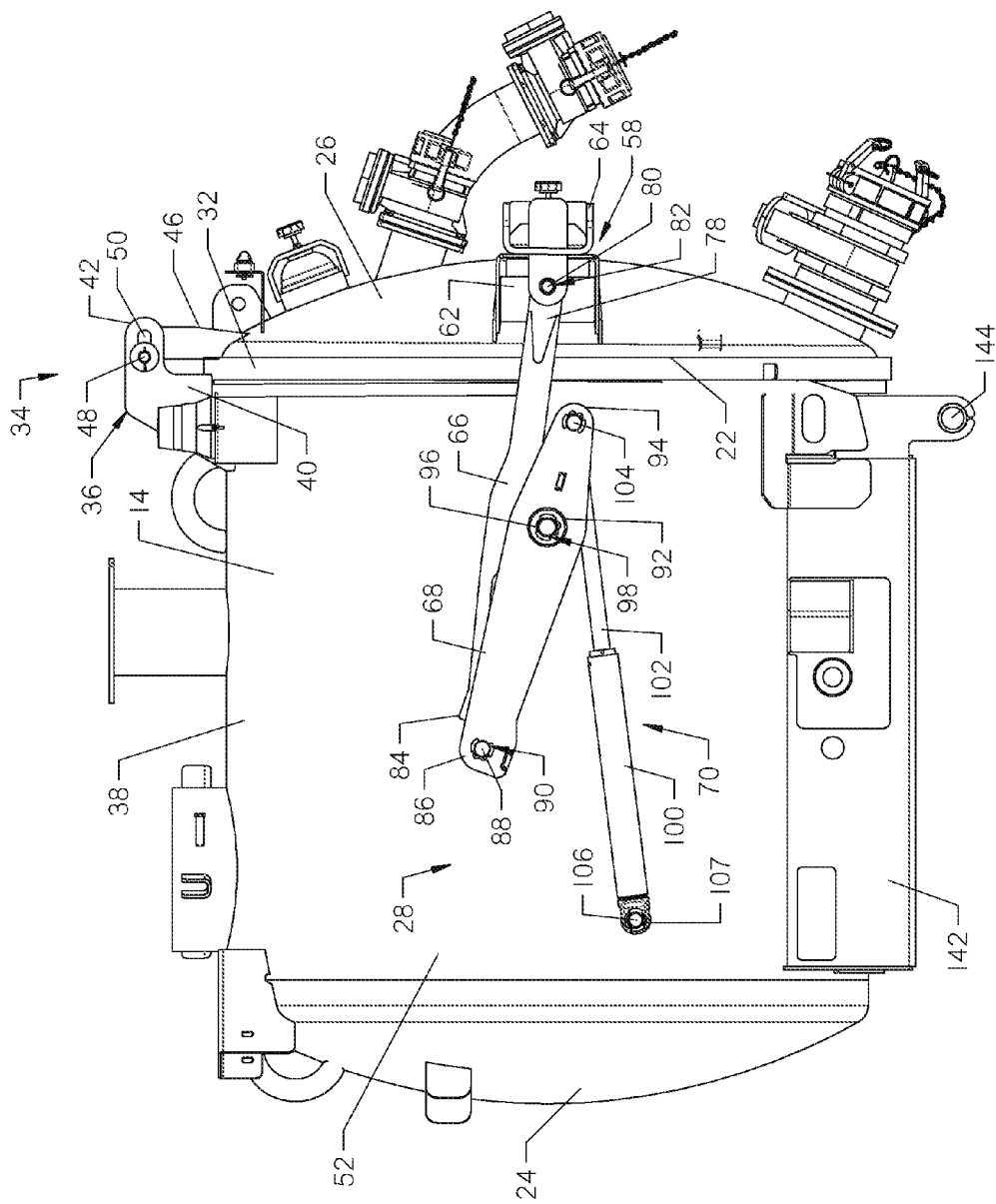
FIG. 5 is a side view of the first side of the tank. The tank is removed from vacuum system and the door is in the closed position.

Turning now to FIGS. 4-5, the tank 14 is shown in more detail. The door 26 is shown in the closed position in FIGS. 4-5. The door 26 is generally circular and dome shaped having an apex at its center. The outer periphery of the door 26 terminates at an edge 30. The edge 30 of the door 26 seals against a sealing flange 32 formed around the outer circumference of the open end 22 of the tank 14.

The door 26 is pivotally supported on the tank 14 with a hinge 34. The hinge 34 comprises a tank bracket 36 that is attached to a top 38 of the tank 14 at its open end 22. The tank bracket 36 comprises two parallel planar members 40. Each planar member 40 has a tab 42 that projects past the open end 22 of the tank 14. The hinge 34 further comprises a door bracket 44 that is attached to the door 26 adjacent the top 38 of the tank 14. The door bracket 44 has two parallel planar arms 46 that extend upwards past the edge 30 of the door 26. The arms 46 are rigidly connected via a cross-bar 48. The cross-bar 48 is disposed through a pair of slots 50 formed in the tabs 42 of the tank bracket 36. The cross-bar 48 may pivot within the slots 50 such that the door 26 pivots relative to the tank 14. The slots 50 are wider than the width of the cross-bar 48. This allows the door 26 to move slightly toward and away from the open end 22 of the tank 14 as it is opened and closed.

The door 26 is opened and closed using the first door lifting assembly 28. The first door lifting assembly 28 is attached to a first side 52 of the tank 14. A second door lifting assembly 54 is attached to a second side 56 of the tank 14 (FIGS. 2-3). The lifting assemblies 28, 54 are configured to distribute the closing force applied to the door 26 uniformly about the periphery of the door 26. An evenly distributed closing force upon the door 26 helps to create a uniform seal around the periphery of the tank 14. This helps to reduce the likelihood of dimpling or deforming the door 26.

The lifting assemblies 28, 54 are each attached to the outer surface of the door 26 via a bracket 58 and a second bracket 60. The brackets 58, 60 are attached to the opposite sides of the outer periphery of the middle of the door 26. The brackets 58, 60 are an equal distance from the apex of the door 26. Each bracket 58, 60 comprises a mounting member 62 that is attached to the outer surface of the door 26. Each bracket 58, 60 further comprises a horizontal member 64 attached to the outer surface of the mounting member 62. The first door lifting assembly 28 and the second door lifting assembly 54 work in concert to open and close the door 26. The assemblies 28, 54 pull the door 26 closed by pulling on the brackets 58, 60. The brackets 58, 60 help distribute the closing force uniformly around the periphery of the door 26.

The first door lifting assembly 28 comprises an elongate first upper linkage arm 66, an elongate first lower linkage arm 68, and a first hydraulic cylinder 70. The second door lifting assembly 54 is configured identically to the first door lifting assembly 28. The second door lifting assembly 54 comprises an elongate second upper linkage arm 72, an elongate second lower linkage arm 74, and a second hydraulic cylinder 76 (FIGS. 2-3). Simultaneous activation of the hydraulic cylinder 70 and the second hydraulic cylinder 76 causes the arms 66, 68 and 72, 74 to extend or retract to open and close the door 26.

Continuing with FIGS. 4-5, a first end 78 of the upper linkage arm 66 is pivotally attached to the mounting bracket 58 via a pivot pin 80. The pivot pin 80 coincides with a first pivot axis 82. A second end 84 of the upper linkage arm 66 is pivotally attached to a first end 86 of the lower linkage arm 68 via a pivot pin 88. The pivot pin 88 coincides with a second pivot axis 90.

Figure 11:
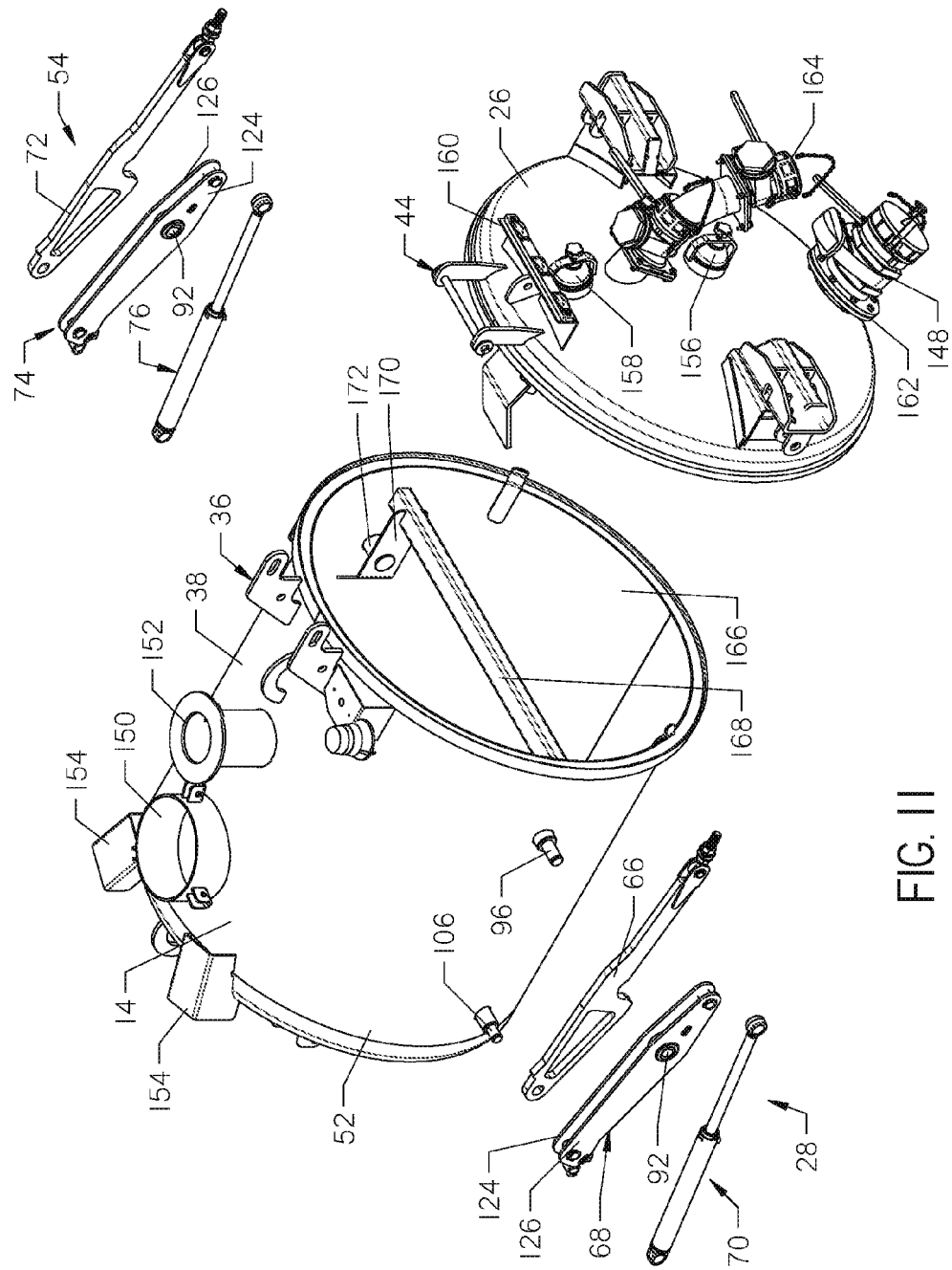
FIG. 11 is a partially exploded view of the tank. The first side of the tank is shown. The tank is removed from the vacuum system and the first linkage assembly and a second linkage assembly are shown in an exploded fashion. The door is shown removed from the tank to expose an interior of the tank.

The lower linkage arm 68 has a shaft or stub housing 92 formed between its first end 86 and second end 94. The stub housing 92 has an opening for receiving a shaft or stub 96. The stub 96 is best shown in FIG. 11, which is an exploded view of the first door lifting assembly 28. The stub 96 projects externally out from the first side 52 of the tank 14. The stub 96 supports the lower linkage arm 68 on the first side 52 of the tank 14. The stub housing 92 in the lower linkage arm 68 may pivot about the stub 96. The stub 96 coincides with a shaft axis or third pivot axis 98.

The hydraulic cylinder 70 comprises a cylinder 100 and a piston 102. The second end 94 of the lower linkage arm 68 is pivotally attached to the end of the piston 102 via a pivot pin 104. An externally projecting cylinder shaft 106 is also attached to the first side of the tank 14 proximate its closed end 22. The cylinder shaft 106 is best shown in FIG. 11. A cylinder shaft housing 107 is formed at the end of the cylinder 100 for receiving the cylinder shaft 106. The hydraulic cylinder 70 is supported on the first side 52 of the tank 14 via the cylinder shaft 106.

Figure 6:
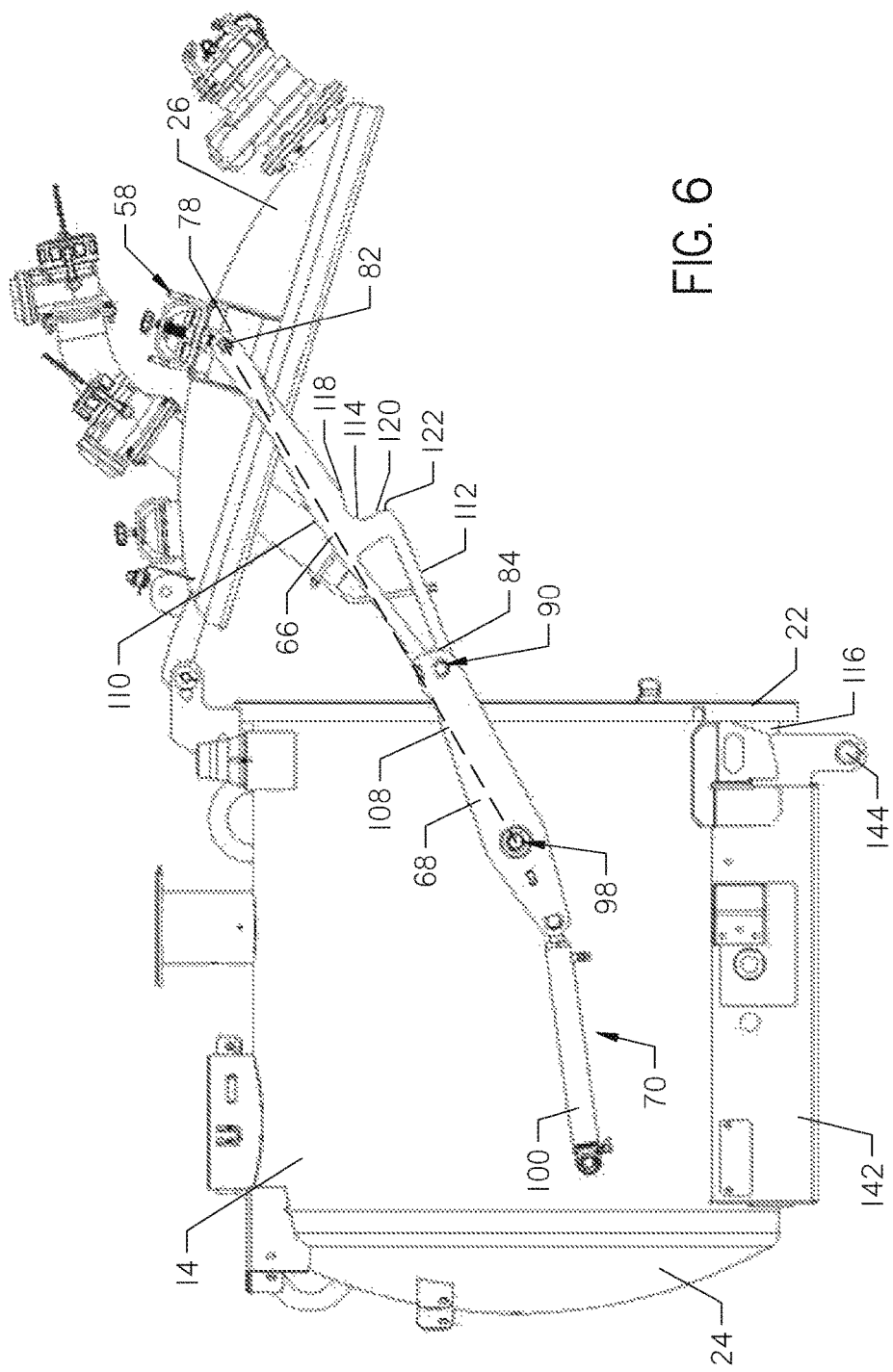
FIG. 6 is a side view of the first side of the tank. The tank is removed from vacuum system and the door is in a fully opened position.

Turning now to FIG. 6, the door 26 is shown in a fully opened position. When the door 26 is fully open, the piston 102 is entirety retracted within the cylinder 100 and the arms 66, 68 are fully extended. Retraction of the piston 102 within the cylinder 100 forces the arms 66, 68 to extend upwards. The first pivot axis 82 and the third pivot axis 98 are on the same reference plane. The reference plane is designated by dashed line 108. The second pivot axis 90 crosses the reference plane as the door 26 is moved from the closed position to a fully opened position. Once the door 26 is in the fully opened position, the second pivot axis 90 is positioned beneath the reference plane or dashed line 108. In this position, the door 26 is biased toward an open position or state without the need for constant pressure from the hydraulic actuator 70.

The second door lifting assembly 54 operates simultaneously and identically as the first door lifting assembly 28 when the door 26 is opened. As discussed below, the second door lifting assembly 54 also operates simultaneously and identically as the first door lifting assembly 28 with the door is closed.

As shown in FIG. 6, the upper linkage arm 66 has a top surface 110 and a bottom surface 112. A socket 114 is formed in the bottom surface 112 of the arm 66 between its first end 78 and second end 84. The socket 114 opens towards a bottom 116 of the tank 14. The socket 114 has a boundary having the shape of a circular arc. In one embodiment, the boundary may be semi-circle. The boundary of the socket 114 has opposed first and second ends 118 and 120. A ramp 122 is formed between the second end 120 and the bottom surface 112 of the upper linkage arm 66. The second upper linkage arm 72 is configured identically to the upper linkage arm 66.

Turning back to FIG. 4, the lower linkage arm 68 comprises an inner member 124 and an outer member 126. This is also shown in FIG. 11. The stub housing 92 is formed in both the inner and outer members 124, 126. The stub 96 is disposed through stub housing 92 formed in both the inner and outer member 124, 126. When the door 26 is in the closed position, as shown in FIG. 4, the upper linkage arm 66 may be positioned between the inner and outer member 124, 126 of the lower linkage arm 68.

With reference now to FIGS. 7-10, the process of closing and latching the door 26 is shown in more detail. In FIGS.

Figure 7:
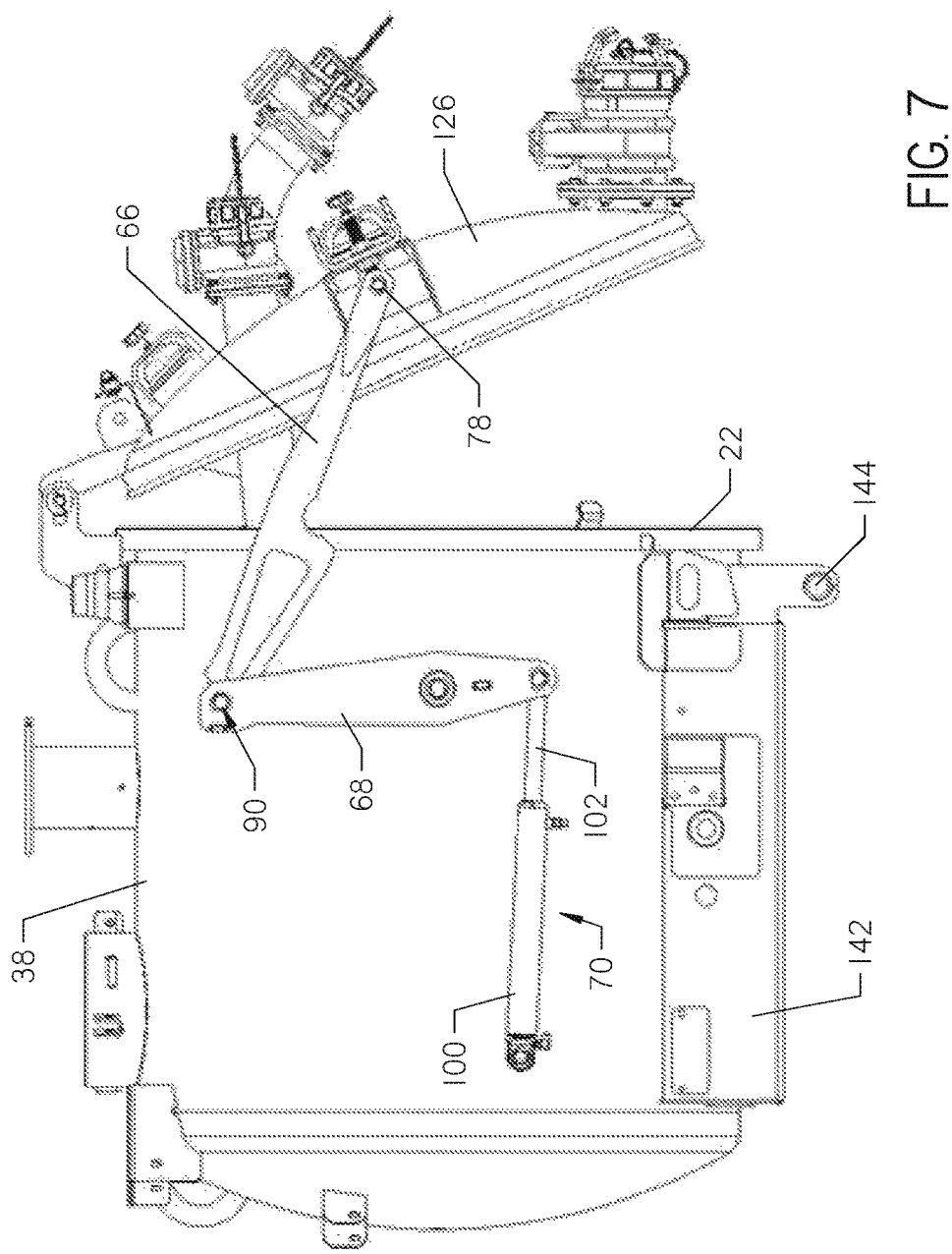
FIG. 7 is a side view of the first side of the tank. The tank is removed from vacuum system and the door is approximately halfway between the open and closed position.
Figure 8:
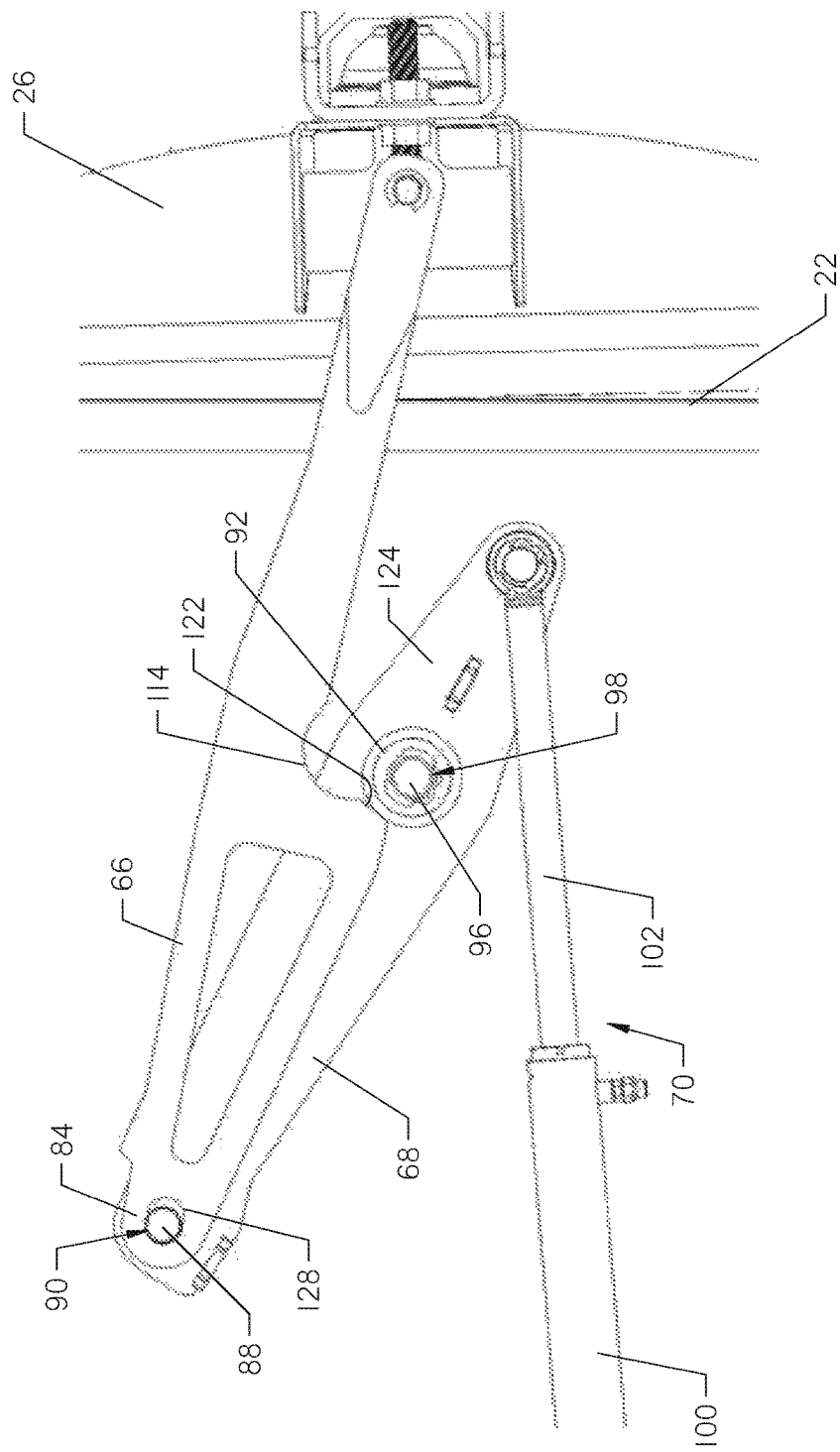
FIG. 8 is a close up view of a door lifting assembly on the first side of the tank. An upper linkage arm of the door lifting assembly is shown starting to engage with a lower linkage arm as the door is closing. An outer member of the lower linkage arm has been removed to better show this engagement.
Figure 9:
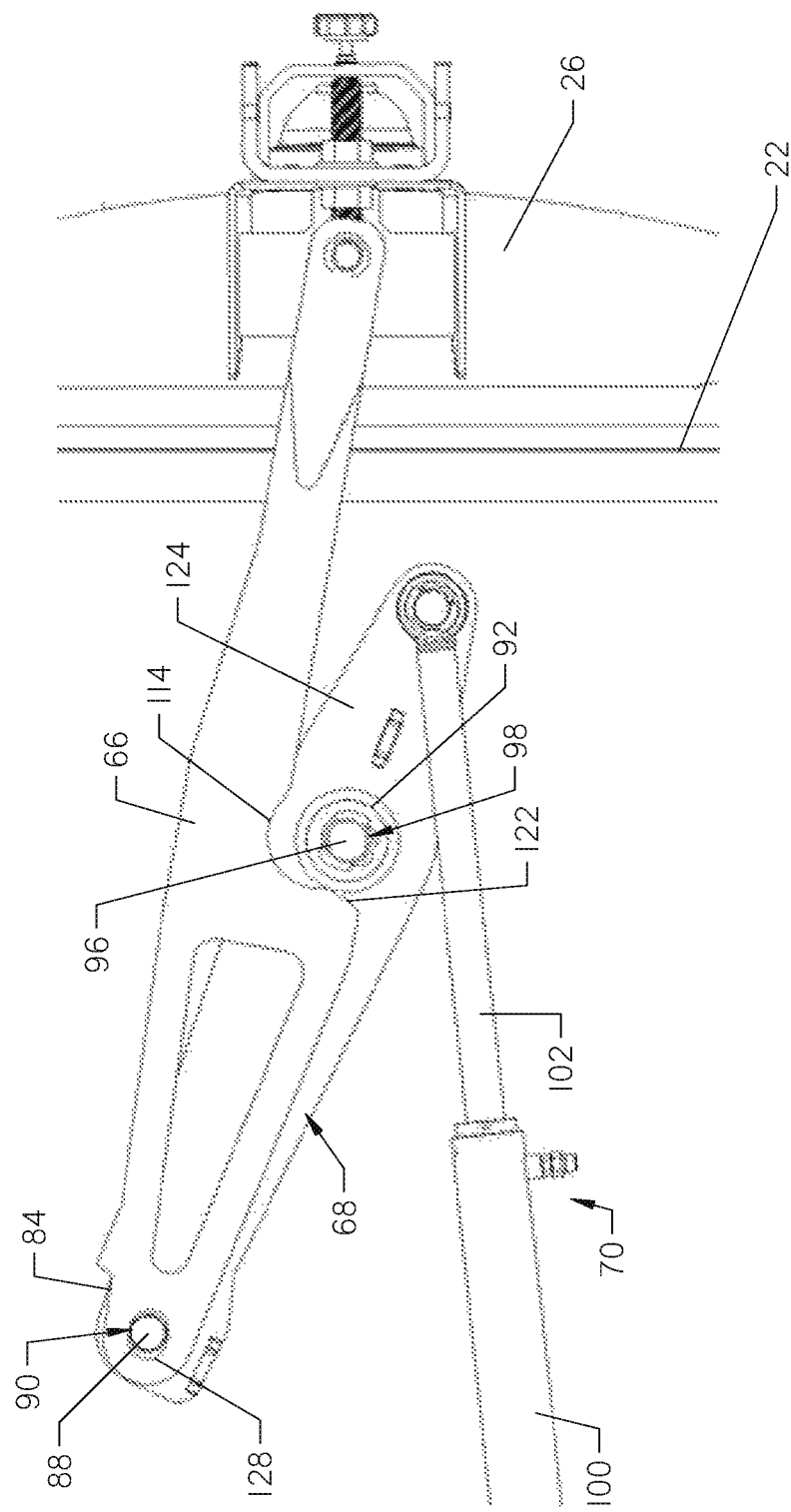
FIG. 9 is the view of FIG. 8 with the upper linkage arm further engaged with the lower linkage arm as the door is further closed.

8-10, the outer member 126 of the lower linkage arm 68 has been removed to better show this process. In FIG. 7, the piston 102 is partially extended from the cylinder 100. This causes the second pivot axis 90 to pivot upwards towards the top 38 of the tank 14. As the second pivot axis 90 pivots upwards, it pulls the first end 78 of the upper linkage arm 66 downwards. This causes the upper linkage arm 66 to pull the door 26 towards the open end 22 of the tank 14. As the piston 102 extends farther out of the cylinder 100, as shown in FIGS. 8-9, it forces the second pivot axis 90 to pivot downwards towards the cylinder 100. This causes the arms 66, 68 to begin folding together.

Figure 10:
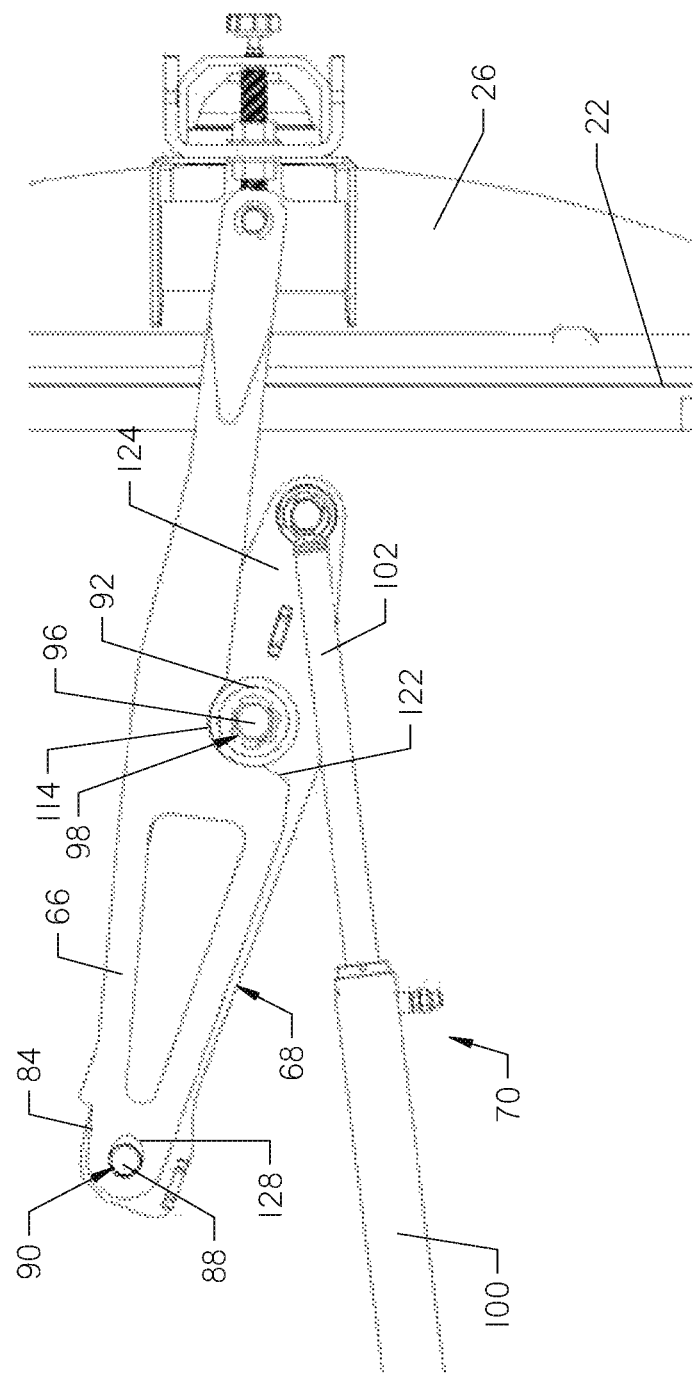
FIG. 10 is the view of FIG. 9 with the upper linkage arm fully engaged with the lower linkage arm and the door is fully latched and in the closed position.

Continuing with FIGS. 8-10, as the arms 66, 68 approach one another, the ramp 122 on the upper linkage arm 66 starts to engage with the stub housing 92 formed in the inner member 124 of the lower linkage arm 68. As the ramp 122 engages with the stub housing 92 the ramp 122 directs the stub housing 92 into the socket 114. The door 26 is fully closed and sealed when the stub housing 92 is fully seated within the socket 114, as shown in FIG. 10.

Seating the stub housing 92 within the socket 114 locks the linkage arms 66, 68 in place and pulls the door 26 toward the open end 22 of the tank 14 with a force that is not generated by the hydraulic cylinder 70. If the hydraulic cylinder 70 were removed from the first side 52 of the tank 14 when the stub housing 92 is seated within the socket 114, the door 26 would remain closed. The outer member 126 of the lower linkage arm 68 covers the connection between the stub housing 92 and socket 114 when the door 26 is closed. This helps protect the connection from any outside debris during operation.

As shown in FIGS. 8-10, the second end 84 of the upper linkage arm 66 comprises a slot 128 for receiving the pivot pin 88 at the second pivot axis 90. The slot 128 allows the pivot pin 88 to move laterally at the second pivot axis 90. The lateral movement of the pivot pin 88 within the slot 128 allows the ramp 122 to direct the stub housing 92 into the socket 114 to latch the door 26 closed.

Turning back to FIGS. 1-3, the overall vacuum system 10 is shown in more detail. The power source 16 of the vacuum system 10 is supported on a front end 130 of the trailer 12. The tank 14 is supported on a rear end 132 of the trailer 12 such that the door 26 of the tank 14 is accessible at the rear end 132 of the trailer 12. The power source 16 may comprise an internal combustion engine or an electric motor. The power source 16 is used to supply power to the various components of the system 10 during operation.

The vacuum pressure system 18 is disposed on the side of the trailer 12 adjacent the tank 14. The vacuum pressure system 18 is used to pull air from the tank 14 to create a vacuum within the tank. The vacuum created in the tank 14 causes debris, including liquid and soil, to be pulled into the tank 14 through the vacuum hose 20. The hose 20 is connected to the top 38 of the tank 14 and supported on a boom 134. The boom 134 is pivotally connected to the tank 14 to allow an operator to swing the hose 20 to a desired location. In an alternative configuration the hose 20 may be connected to the door 26 at an inlet 136.

A reservoir 138 is also supported on the trailer 12 between the power source 16 and the tank 14. The reservoir 138 holds water that may be used to break up soil to be excavated by the vacuum system 10. In operation, water is pumped from the reservoir 138 and expelled from a water hose (not shown) at high pressure to break up the soil to be excavated. The vacuum system 10 is then used to clear away the soil and water mixture.

A tool carrier 140 may also be mounted to the trailer 12 beside the tank 14. The tool carrier 140 may be configured to store detachable portions of the hose 20 or other tools needed during excavation operations during non-use or transport of the system 10.

The tank 14 is supported on the trailer 12 with a mounting bracket 142. The mounting bracket 142 is rectangular in shape. The bottom 116 of the tank 14 sits down within and is secured to the bracket 142. The mounting bracket 142 is pivotally connected to the trailer 12 at connector points 144. The connector points 144 are below the open end 22 of the tank 14.

A hydraulic lifting assembly 146 is attached to the trailer 12 and the sides of the mounting bracket 142. When activated, the hydraulic lifting assembly 146 pivots the mounting bracket 142 forward at the connector points 144. This pivoting motion causes the tank 14 to tide downward. Pivoting the tank 14 in this manner allows contents to be dumped from the tank 14 when the door 26 is open. A gate valve 148 is also formed on the door 26 proximate the bottom 116 of the tank 14. Contents may be removed from the tank 14 by opening the gate valve 148 if the door 26 is in the closed position.

Turning now to FIGS. 4 and 11, a flange 150 is supported on the top 38 of the tank 14. The flange 150 is configured for connection to the vacuum pressure system 18 to create a vacuum in the tank 14. A second flange member 152 adjacent the flange 150 is also supported on the top 38 of the tank 14. The second flange member 152 provides a base for the boom 134 and an inlet port for the hose 20. The second flange member 152 may be used when the boom 134 is used to collect material into the tank 14. A bracket or brackets 154 may also be supported on the tank 14 proximate its closed end 24. The brackets 154 may be used to connect additional components to the tank 14, such as hydraulics to operate the boom 134.

With reference now to the door 6, a sight glass 156 is formed at the center or apex of the door 26. The sight glass 156 permits an operator to visually inspect the interior of the tank 14 when the door 26 is closed. The door 26 may also comprise a second sight glass 158 disposed proximate the top 38 of the tank 14. When in-tank material becomes visible through the second sight glass 158, an operator will know that the tank is nearly full. An L-shaped bracket 160 may also be attached to the outer surface of the door 26 between the door bracket 44 and the second sight glass 158. The L-shaped bracket 160 may be configured to support reflectors or warning lights.

A flange 162 is also shown supported on the door 26 proximate the bottom 116 of the tank 14. The flange 162 supports the gate valve 148. The gate valve 148 allows for the removal of material and fluids from the tank 14 without requiring the door 26 to be opened. The inlet 136 may be positioned on the door 26 above the sight glass 156. The inlet 136 may be connected to the vacuum hose 20. A vacuum air stream may be pulled through the inlet 136 if the boom 134 arrangement is not used. The inlet 136 is closed off with a plug 164.

Referring now only to FIG. 11, an interior 166 of the tank 14 is shown. A support member 168 may be disposed across the center diameter of the tank 14 proximate its open end 22. The support member 168 may comprise a pipe, a square tube member, or possibly an elongate member having an oval-shaped cross sectional profile. The support member 168 may be supported on brackets 170. The brackets 170 may also support the stub 96 and a second stub 172 that project out from the first side 52 and the second side 56 of the tank 14.

The support member 168 helps to maintain the shape of the tank 14 by reducing the likelihood the tank will warp during manufacture or use of the vacuum system 10. A pair of support members 168 may also be used in lieu of a single support member. One support member may be disposed above the center diameter of the tank 14 and a second support member may be disposed below the center diameter of the tank.

Figure 12:
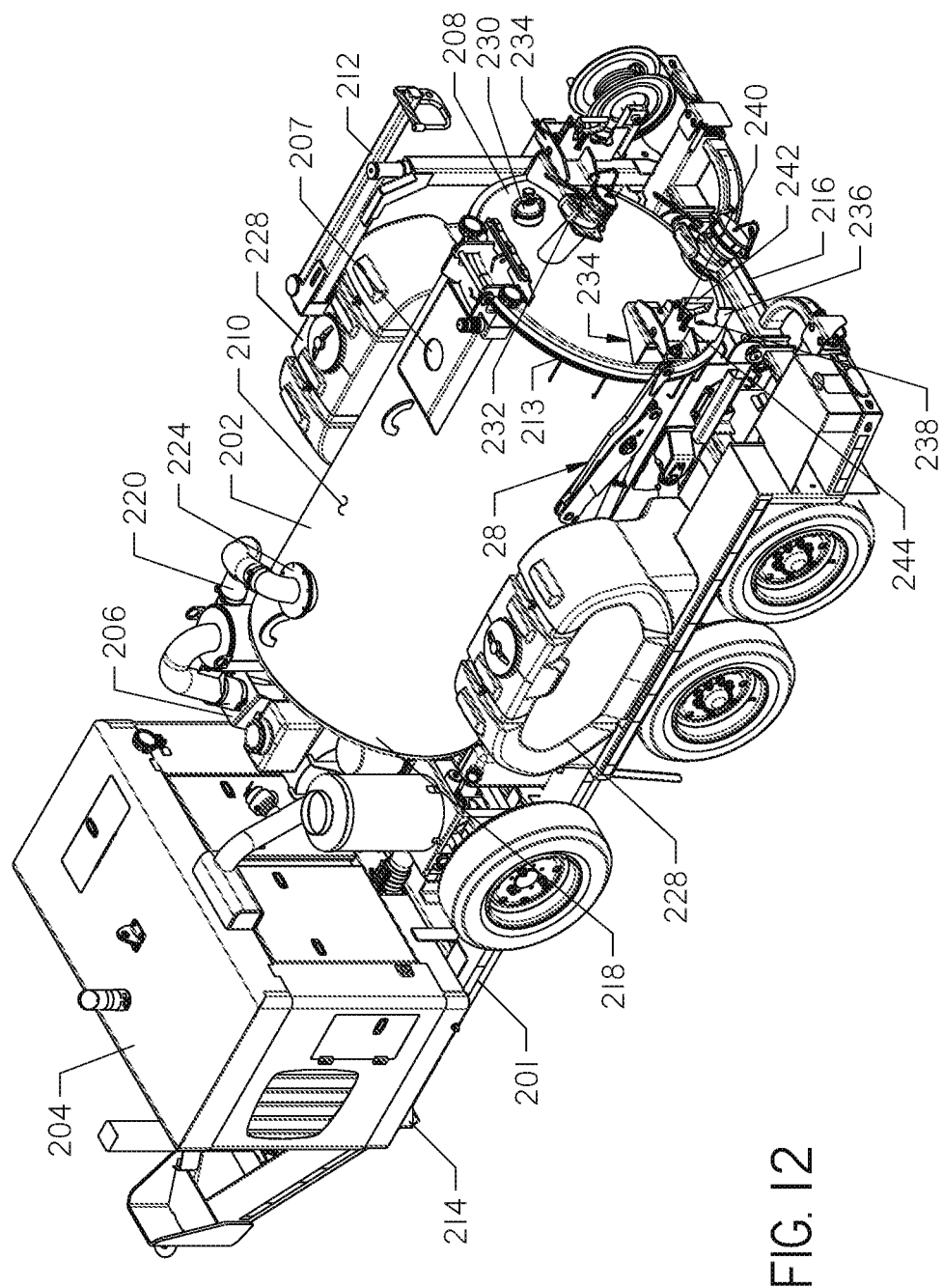
FIG. 12 is a perspective view of a first side of an alternative embodiment of the vacuum system.
Figure 13:
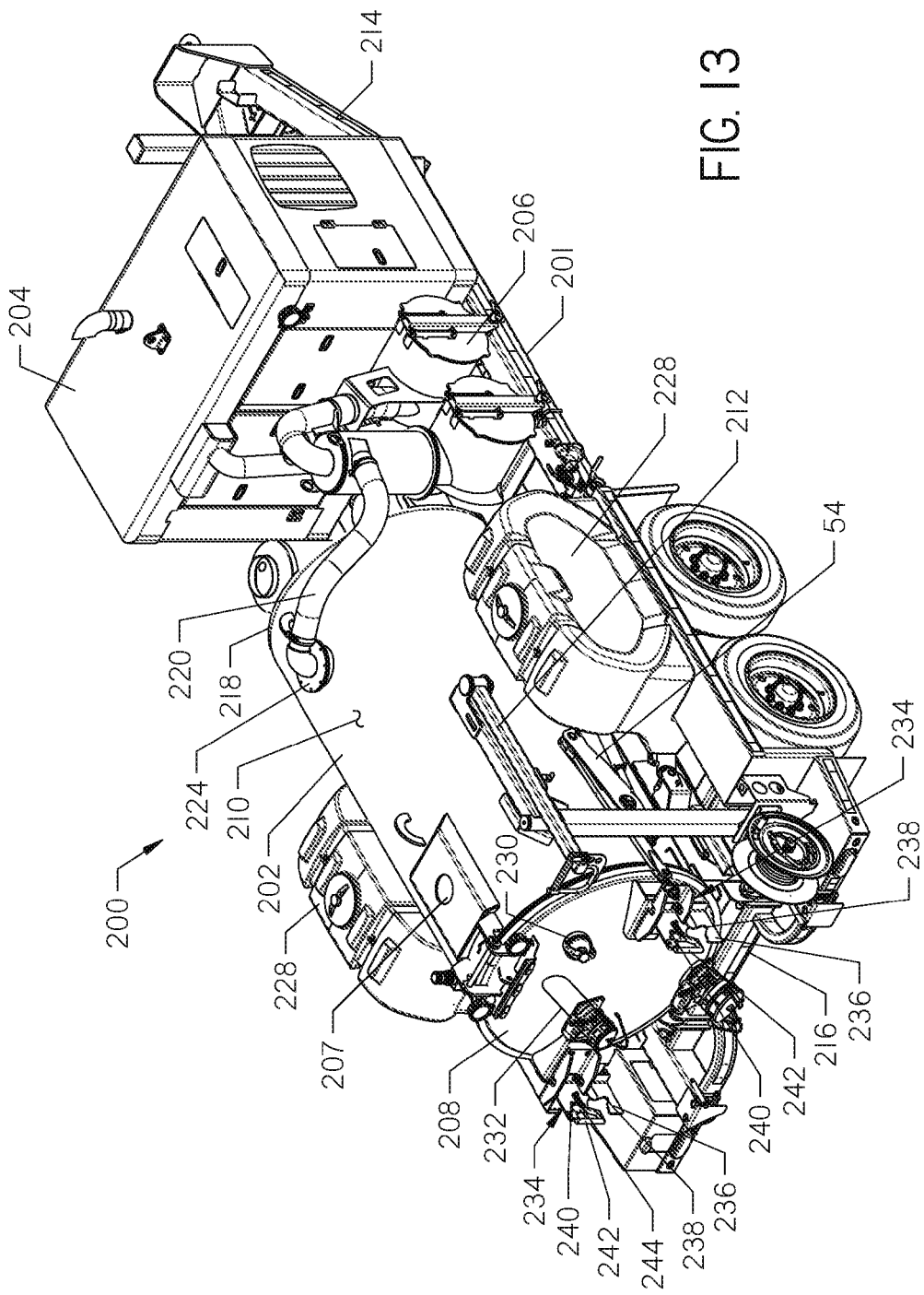
FIG. 13 is a perspective view of a second side of the alternative embodiment of the vacuum system shown in FIG. 12.

Turning now to FIGS. 12-13, an alternative embodiment of the vacuum system 200 is shown supported on a trailer 201. The vacuum system 200 comprises a tank 202, a power source 204, a vacuum pressure system 206, and a vacuum hose (not shown). The vacuum hose attaches to an inlet 207 on a top 210 of the tank 202. The vacuum hose may be supported and moved around on the articulating jib 212.

The power source 204 of the vacuum system 200 is supported on a front end 214 of the trailer 201. The power source 204 is identical to the power source 16. The tank 202 has a door 208 that closes an open end 213 of the tank 202. The tank 202 is supported on a rear end 216 of the trailer 201 such that the door 208 of the tank 202 is accessible at the rear end 216 of the trailer 201.

The vacuum pressure system 206 is supported on the trailer 201 between the power source 204 and a closed end 218 of the tank 202. The vacuum pressure system 206 comprises a hose 220 that is attached to an inlet 224 at the top 210 of the tank 202. The vacuum pressure system 206 pulls air from inside of the tank 202 to create a vacuum within the tank 202.

A pair of reservoirs tanks 228 is supported on the trailer 201 on opposite sides of the tank 202. Like reservoir 138, the reservoir tanks 228 hold water that may be used to break up soil to be excavated. The vacuum system 200 is then used to clear away the soil and water mixture.

The tank 202 uses the same lifting mechanisms 28 and 54 as the tank 14 to open and close the door 208. The door 208 is identical to door 26 except that only one sight glass 230 is shown on the door 208. The sight glass 230 is positioned adjacent an alternative hose inlet 232. A pair of mounting brackets 234 is also shown attached to opposite sides of the door 202. Like mounting brackets 58 and 60, the mounting brackets 234 are each attached to the lifting mechanisms 28 and 54. The mounting brackets 234 are identical to mounting brackets 58 and 60 except that mounting brackets 234 each further comprise a tool mount 236.

The tool mount 236 has a hook 238 and a notch 240. The hook 238 and notch 240 may be used to support tools on the door 202. A latch 242 is also attached to the tool mount 236. The latch 242 works to hold the tools in place on either the hook 238 or the notch 240 when the latch is in a latched position. The latch 242 is shown in a latched position in FIGS. 12-13. The latch 242 is held in place by a spring 244. The latch 242 may be temporarily pulled outward by extending the spring and turned 90 degrees in order to place a tool on the hook 238 or in the notch 240.

Although the preferred embodiment has been described in detail, it should be understood that various changes, substitutions and alterations can be made therein without departing from the spirit and scope of the invention as defined by the appended claims.

What is claimed is:

1. A vacuum system comprising:
   a tank having an open end, a closed end, and a first side having a stub attached to and projecting out therefrom;
   a door used to close the open end of the tank; and
   a door lifting assembly comprising:
      an upper linkage arm, having a first end connected to an outer surface of the door and a second end, the upper linkage arm comprising a socket disposed between the first end and the second end;
      a lower linkage arm, having a first end and a second end, the lower linkage arm comprising stub housing disposed between the first end and the second end through which the stub is received; and
      a hydraulic cylinder connected to the second end of the lower linkage arm;
   wherein activation of the hydraulic cylinder causes the socket on the upper linkage arm to engage with the stub housing disposed in the lower linkage arm.

2. The vacuum system of claim 1 wherein the first end of the upper linkage arm is pivotally secured to the outer surface of the door at a first pivot axis, and the first end of the lower linkage arm is pivotally secured to the second end of the upper linkage arm at a second pivot axis, and the stub housing and the first pivot axis are on a first plane when the linkage arms are fully extended and the door is in an open position, and the second pivot axis is beneath the first plane when the linkage arms are fully extended and the door is in an open position.

3. The vacuum system of claim 2 wherein the hydraulic cylinder comprises a piston and a cylinder, wherein the linkage arms are fully extended when the piston is retracted within the cylinder.

4. The vacuum system of claim 1 wherein the socket is formed on a bottom surface of the upper linkage arm and opens towards a bottom of the tank.

5. The vacuum system of claim 4 wherein the socket has a semi-circle shape.

6. The vacuum system of claim 5 wherein the socket has opposed first and second ends formed at opposite ends of a diameter of the semi-circle, and a ramp is formed between the second end of the socket and the bottom surface of the upper linkage arm.

7. The vacuum system of claim 6 wherein the activation of the hydraulic cylinder causes the ramp to engage with the stub housing and direct the stub housing into the socket.

8. The vacuum system of claim 1 wherein the second end of the lower linkage arm comprises a slot for receiving a pivot pin, wherein the slot allows for lateral movement of the lower linkage arm relative to the pivot pin.

9. The vacuum system of claim 1 wherein the lower linkage arm comprises an inner member and an outer member and the upper linkage arm is positionable between the inner member and the outer member.

10. The vacuum system of claim 1 further comprising:
    a second stub attached to and projecting out from a second side of the tank;
    a second door lifting assembly comprising:
       a second upper linkage arm, having a first end connected to an outer surface of the door and a second end, the upper linkage arm comprising a second socket disposed between the first end and the second end;
       a second lower linkage arm, having a first end and a second end, the second lower linkage arm comprising a second stub housing disposed between the first end and the second end through which the second stub is received; and
       a second hydraulic cylinder connected to the second end of the second lower linkage arm;
    wherein activation of the second hydraulic cylinder causes the second socket on the second upper linkage arm to engage with the second stub housing disposed in the second lower linkage arm.

11. The vacuum system of claim 10 wherein the first end of the second upper linkage arm is pivotally secured to the outer surface of the door at a first pivot axis and the first end of the second lower linkage arm is pivotally secured to the second end of the second upper linkage arm at a second pivot axis, and the second stub housing and the first pivot axis of the second door lift assembly are on a first plane when the second linkage arms are fully extended and the door is in an open position; and the second pivot axis of the second door lift assembly is beneath the first plane when the second linkage arms are fully extended and the door is in an open position.

12. A lifting mechanism for opening a vacuum tank, the vacuum tank comprising a door and a tank, the lifting mechanism comprising:
   an upper linkage arm, having a first end pivotally secured to the door at a first pivot axis and a second end;
   a lower linkage arm, having a first end and a second end, the lower linkage arm comprising a second pivot axis disposed between the first end and the second end, wherein the lower linkage arm is pivotally secured to a first side of the tank at the second pivot axis, and wherein the first end of the tower linkage arm is pivotally secured to the second end of the upper linkage arm at a third pivot axis;
   a hydraulic cylinder connected to the second end of the lower linkage arm;
   wherein the first pivot axis and the second pivot axis are on a first plane when the linkage arms are fully extended and the door is in an open position; and
   wherein the third pivot axis is beneath the first plane when the linkage arms are fully extended and the door is in an open position.

13. The lifting mechanism of claim 12 wherein the second pivot axis comprises a stub attached to and projecting out from a side of the tank and extending through a stub housing formed in the lower linkage arm for receiving the stub.

14. The vacuum system of claim 12 wherein the hydraulic cylinder comprises a piston and a cylinder, wherein the linkage arms are fully extended when the piston is retracted within the cylinder.

15. The vacuum system of claim 12 further comprising:
   a second upper linkage arm, having a first end connected to the door at a first pivot axis and a second end;
   a second lower linkage arm, having a first end and a second end, the lower linkage arm comprising a second pivot axis disposed between the first end and the second end, wherein the lower linkage arm is connected to a second side of the tank at the second pivot axis, and wherein the first end of the lower linkage arm is connected to the second end of the upper linkage arm at a third pivot axis;
   a hydraulic cylinder connected to the second end of the second lower linkage arm; connected to a second side of the tank at the second pivot axis, and wherein the first end of the lower linkage arm is connected to the second end of the upper linkage arm at a third pivot axis; a hydraulic cylinder connected to the second end of the second lower linkage arm;
   wherein the first pivot axis and the second pivot axis are on a first plane when the second linkage arms are fully extended and the door is in an open position; and
   wherein the third pivot axis is beneath the first plane when the second linkage arms are fully extended and the door is in an open position.

16. An apparatus, comprising:
   a tank having an open end and carrying an externally projecting shaft having a shaft axis;
   a door hingedly mounted at the tank's open end and movable between open and closed positions;
   an elongate lower arm supported by the tank and rotatable about the shaft axis;
   an elongate upper arm pivotally secured to the door at a first pivot axis and pivotally secured to the lower arm at a second pivot axis spaced from the first pivot axis;
   wherein the second pivot axis of the lower arm crosses a reference plane as the door approaches its open position, the reference plane containing both the shaft axis and the first pivot axis.

17. The apparatus of claim 16 further comprising a hydraulic cylinder connected to the elongate lower arm opposite the second pivot axis, wherein the elongate arms are fully extended when a piston is retracted within the cylinder.

18. An apparatus, comprising:
   a tank having an open end and carrying an externally projecting shaft;
   a door hingedly mounted at the tank's open end and movable between open and closed positions;
   an elongate lower arm having a shaft housing through which the shaft extends;
   an elongate upper arm pivotally secured to the door at a first pivot axis and pivotally secured to the lower arm at a second pivot axis spaced from the first pivot axis, the second arm having a socket that opens toward the first pivot axis and within which the shaft housing of the lower arm is at least partially positionable.

19. The apparatus of claim 18 in which a pivot pin joins the upper arm to the lower arm and extends through an oblately-shaped opening formed in the upper arm.

20. The apparatus of claim 19 in which the pivot pin extends through a circular opening formed in the lower arm.

* * * * *

UNITED STATES PATENT AND TRADEMARK OFFICE
CERTIFICATE OF CORRECTION

PATENT NO. : 10,221,602 B2
APPLICATION NO. : 15/481139
DATED : March 5, 2019
INVENTOR(S) : Sewell Page 1 of 1

It is certified that error appears in the above-identified patent and that said Letters Patent is hereby corrected as shown below:

In the Specification

Column 6, Line 17, please delete "tide" and substitute therefore "title".
Column 6, Line 37, please delete "6" and substitute therefore "26".

In the Claims

Column 9, Claim 12, Line 25, please delete "tower" and substitute therefore "lower".

Signed and Sealed this
Sixteenth Day of April, 2019

Andrei Iancu
*Director of the United States Patent and Trademark Office*